United States Patent Office

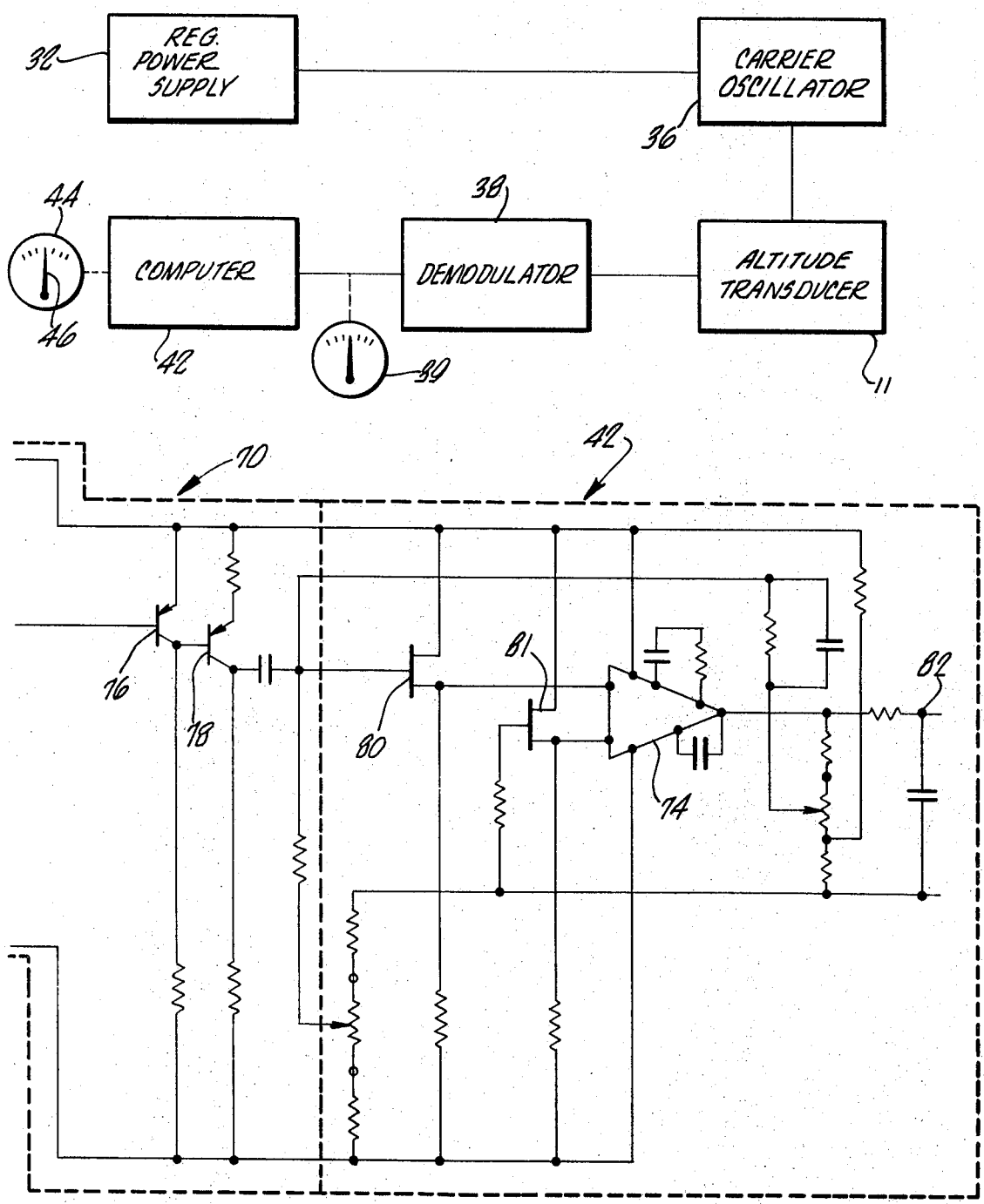

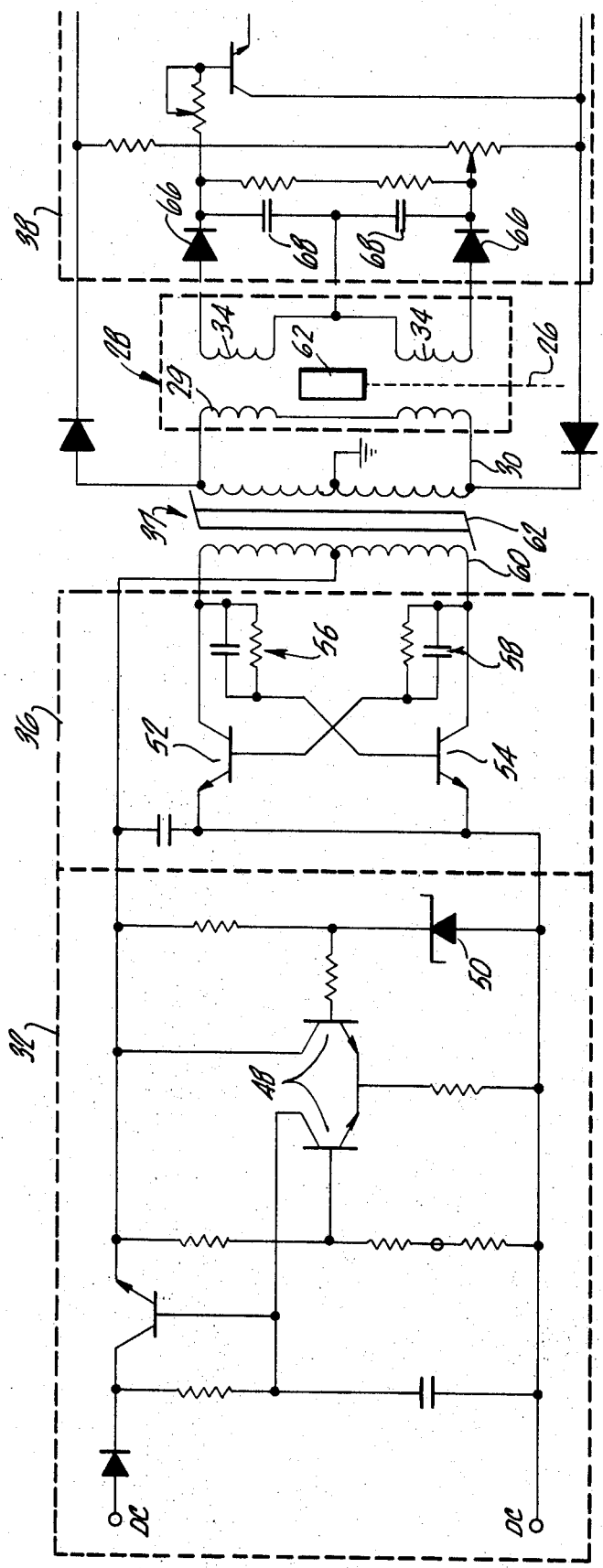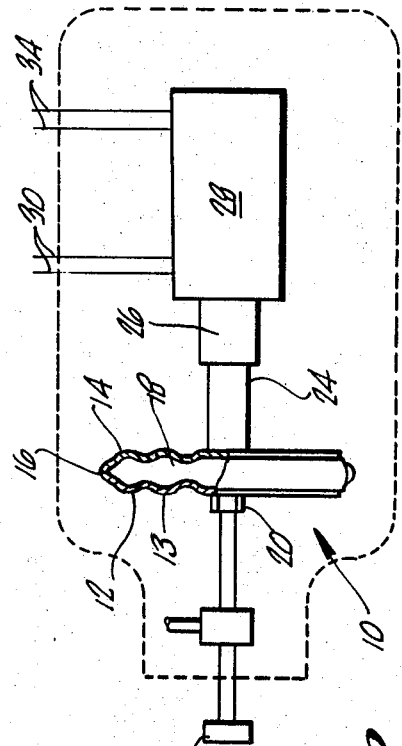
FIG. 1.
FIG. 2.
FIG. 3.
FIG. 4.
FIG. 5.
INVENTOR.
WILLIAM W. DARLINGTON
BY Christie, Parker & Hale
ATTORNEYS.

3,537,308
Patented Nov. 3, 1970

3,537,308
ALTITUDE AND VERTICAL VELOCITY
INDICATOR
William W. Darlington, Sherman Oaks, Calif., assignor to
Edcliff Instruments, Monrovia, Calif., a corporation of
California
Filed June 9, 1967, Ser. No. 644,856
Int. Cl. G01c 23/00
U.S. Cl. 73—179                    1 Claim

ABSTRACT OF THE DISCLOSURE

Altitude and vertical velocity measuring device utilizing a closed, pressure-sensitive capsule with a movable member and a motion sensitive transformer emitting electric signals of a varying magntiude in response to movements of the member under atmospheric pressure changes. Signals emitted by the transformer are used to indicate altitude or a are fed to an operational amplifier to indicate the vertical velocity of a vehicle.

BACKGROUND OF THE INVENTION

This invention relates to apparatus for sensing and indicating the altitude and the vertical velocity of a vehicle. Although it may be used in a great number of vehicles, it is particularly well adapted for use in flying vehicles, such as fixed wing airplanes.

Today almost every airplane is provided with a device to indicate its altitude, and most airplanes also have a device to indicate the rate of climb or descent. To the pilot these instruments are of utmost importance since he has to rely on them to a large extent to operate his aircraft safely and efficiently.

In the past, altimeters as well as vertical velocity indicators have utilized pressure-sensitive devices, such as bellows, in conjunction with sensitive mechanical linkages, to indicate the altitude or the rate of climb or descent of an airplane. In order to sense the relatively small movements of the bellows, a large mechanical advantage had to be obtained to properly actuate an indiactor needle. These mechanical components were not only fragile but unavoidable mechanical tolerances prevented accurate measurements. Repeated exposure to severe shock or vibration often caused the instrument to malfunction.

Presently available vertical indicators utilize a bellows located within an airtight case having a small pin hole orifice to obtain a calibrated leak. These instruments are capable of indicating the vertical velocity of an airplane during its actual climb or descent. However, when the airplane's flight levels out or the rate of climb or descent changes, the reading is misleading since it takes a period of time until the instrument can adjust itself to the new altitude. This misleading indication is a necessary side effect of the calibrated leak method of indicating the vertical velocity because of the time interval it takes for the pressure to equalize through the orifice. Moreover, due to the difficulty of assembling the instrument and accurately adjusting and measuring the calibrated leak, the instruments are characterized by relatively large error tolerances.

SUMMARY OF THE INVENTION

An altimeter or vertical velocity indicator constructed according to this invention provides a rugged instrument that easily withstands all normally occurring shocks and vibrations since no fragile and easily damaged components are necessary for proper functioning.

The instrument includes air tight, pressure sensitive means which is deformable responsive to changes in the surrounding atmospheric pressure. Means connected to the pressure sensitive means convert the deformation thereof into electrical signals. These electric signals are then transmitted by suitable interconnecting means to an altitude indicator or they are translated in signal conditioning means to provide an indication of the vertical velocity of the vehicle.

In one embodiment the pressure sensitive means is an airtight capsule having a mechanical member mounted on its exterior. Changes in pressure around the capsule due to altitude variations of the airplane in which the instrument is provided cause the mechanical member to be deformed responsive to changes in the airplane's vertical position. This movement is transmitted by the mechanical member to a motion sensitive transformer such as the differential transformer described in my U.S. Pat. 3,052,858, which emits electric signals of varying magnitude responsive to mechanical movement of the armature of the transformer.

Since there are no unavoidable tolerances due to a multiplicity of mechanical components and all components are ruggedly constructed, the accuracy as well as the resistance of the instrument against mishandling is substantially improved. The absence of a calibrated leak to measure the vertical velocity of the vehicle permits the instrument to instantaneously indicate the vertical velocity as well as any changes therein. With the best laboratory testing equipment available at the present time, accuracy in the readings of the instrument are found to be on the order of ±5%.

BRIEF DESCRIPTION OF THE DRAWINGS

FIG. 1 is a block diagram showing the functional arrangement of the components of the present invention;

FIG. 2 is a partial block diagram illustrating the connection between the pressure-sensing device and a differential transformer;

FIG. 3 is a schematic diagram of a power supply and a differential transformer utilized in the instrument;

FIG. 4 is a schematic diagram of the signal conditioning portion of the instrument circuitry; and FIG. 5 is a diagram illustrating the relation of the diagrams of FIGS. 3 and 4.

DESCRIPTION OF THE PREFERRED EMBODIMENTS

In FIG. 2 a conventional pressure sensitive capsule or bellows 10 is shown. Capsule 10 includes a pair of spaced apart plates 12 and 14, preferably of circular configuration and formed to include a plurality of concentric corrugations 13. The plates 12 and 14 are joined together at their peripheries 16 by a conventional method such as soldering or fusion welding, thereby forming a hermetically sealed chamber 18 between the plates. In the preferred embodiment, the plates are fabricated of a flexible material and are stressed to provide substantially linear deflection with changes in altitude. Capsules in which deflection is linear with altitude are readily available commercially, and suitable capsules have been purchased by the inventor from the Senflex Corporation of Greenwich, Connecticuit and the Bristol Division of American Chain and Cable Co., Waterbury, Conn.

Plate 12 includes a fitting 20 connected to control knob 22 for calibrating the capsule relative to the prevailing barometric pressure at sea level. Adjustment 22 is used to correct for deviations in the readings of the instrument due to barometric pressure variations. Plate 14 includes an elongated ram 24 which is secured to a shaft 26 of a motion sensitive transformer 28 such as a linear variable differential transformer (LVDT). Movements of the plate 14 are thereby transmitted by ram 24 to the transformer are translated therein into electric signals. The combination of capsule 10 and transformer 28 will be referred to herein as an altitude transducer 11.

The transformer, preferably constructed according to the above referenced patent, includes leads 30 to connect the primary winding of the transformer to an electric power supply and leads 34 which connect to the secondary winding of the transformer to suitable indicating devices or additional circuitry for transmitting electric signals that are responsive to the relative position of shaft 26, ram 24, and plate 14.

In the atmosphere, pressure decreases non-linearly with increases in altitude. In the presently preferred embodiment the capsule is constructed such that the plate 14 moves linearly in response to altitude changes and non-linearly relative to pressure changes. Alternatively, capsule 10 is constructed in the manner of a conventional aneroid capsule in which plate 14 moves linearly in response to changes in the outside pressure.

If the pressure-sensitive device is constructed such that the movements of plate 14 are linear relative to changes in the altitude of the vehicle, the transformer emits electric signals whose magnitude changes linearly with changes in the position of plate 14 and shaft 26. Should the pressure-sensing device be constructed such that plate 14 is constrained to move linearly with changes in pressure, the transformer 28 is then normally provided with a compensating nonlinearity such that the signals generated in the secondary winding again bear a linear relationship to altitude variations.

Preparatory to use in flight, the instrument is calibrated, i.e., the deflection of plate 14 of evacuated chamber 18 is adjusted to the prevailing barometric pressure at sea level. This operation is normally performed on all altimeters to enable them to indicate altitude in relation to sea level and to eliminate errors that would result from variations in the barometric pressure. During level flight of an airplane, the pressure on the capsule remains constant at a value less than sea level pressure. With reduced pressure on the chamber, plate 14 has moved away from plate 12. At this point, the transformer being connected to plate 14 by ram 24, emits a constant signal which is linearly related to the altitude at which the airplane is flying.

The instant the airplane begins to climb, the atmospheric pressure declines, permitting plate 14 to move still further away from plate 12. This movement is transmitted to shaft 26 of the transformer and causes a change in the signals emitted by the transformer. At any instant of time the emitted signal is directly proportional to the altitude of the airplane. When the airplane again resumes level flight, the movement of plate 14 ceases since the outside pressure remains constant. If the airplane begins to descend, the atmospheric pressure increases thereby moving plate 14 toward plate 12. This movement is again transmitted to shaft 26 of the transformer and causes a corresponding change in the emitted signals. These signals from the differential transformer are used to indicate either the altitude or the vertical velocity of the airplane as indicated below.

In FIG. 1 is shown a block diagram of the components of the present invention. As shown therein, a regulated power supply 32 is connected through a carrier oscillator 36 to the altitude transducer 11. In the preferred embodiment, power supply 32 is a D.C. power supply, the output of which powers a carrier oscillator. The output of the oscillator in turn is modulated by the mechanical motions of altitude transducer 11. As indicated above, deformation of the pressure sensitive capsule 12 actuates shaft 26 changing the magnetic circuit of differential transformer 28 thereby modulating the output from the secondary winding of transformer 28. The modulated output from transducer 11 is thereafter transmitted to a demodulator 38.

The output of the demodulator is fed to a computer 42 or alternatively to an indicator 39. Since the output of the demodulator is directly proportional to altitude, proper calibration of indicator 39 (typically, a volt meter) will produce an indication of altitude of the vehicle in which the apparatus is mounted. When transmitted to computer 42, the output of the demodulator is differentiated, the otuput of the computer 42 being the first derivative of altitude, i.e., the rate of change in altitude or vertical velocity. The output of the computer is transmitted to an indicator 44 whose scale is calibrated in velocity units such that the indications thereof can be read in terms of the vertical velocity of the vehicle.

In a second preferred embodiment of the instrument the pressure-sensing device 10 and the differential transformer 28 are utilized to simultaneously indicate the altitude and the vertical velocity of the aircraft. This is accomplished by connecting the indicator 39 and the computer 42 to the output side of demodulator 38. The vertical velocity indicator 44 is connected to receive the electric signals after they have been differentiated in the computer. This arrangement permits the utilization of a single sensing device 10 and a single transformer 28 for both the altimeter and the vertical velocity indicator of the aircraft. Such a combination makes the units substantially more economical and compact than presently available instruments since one set of components simultaneously performs two functions.

In FIG. 3 is shown the schematic diagram of the regulated power supply 32, carrier oscillator 36, differential transformer 28 and demodulator 38. DC power from the vehicle in which the vertical velocity indicator of this invention is mounted is connected to power supply 32 and the signal from this supply is regulated by a transistor pair 48 and clamped by Zener diode 50. The regulated DC output is supplied to oscillator 36, a push-pull oscillator utilizing transistors 52 and 54, DC bias circuits 56 and 58 and square core carrier transformer 37. Under drive from transistors 52 and 54 transformer 37 periodically saturates and reverses generating a square wave carrier signal in the secondary winding which is in turn transmitted to the primary winding 29 of differential transformer 28. The carrier signal is then modulated by the movements of armature 62 which is mechanically linked to shaft 26 and the modulated signal in secondary winding 34 is transmitted to rectifiers 66 (symbolized by a diode pair) and capacitors 68. The rectifiers are connected in a bucking arrangement such that a DC difference signal proportional to the deflection of the capsule is produced. This DC signal is then connected to either an altitude indicator or to signal conditioning means such as a computer circuit 42. When the signal output from the demodulator is differentiated in computer 42, the output signal therefrom is proportional to the vertical velocity of the vehicle in which the indicator is mounted.

The schematic of computer 42 is shown in FIG. 4 and consists essentially of two parts, a buffer amplifier 70 and an operational amplifier 74. The function of buffer amplifier 70 is to isolate the operational amplifier from the altitude transducer and comprises transistors 76 and 78 arranged in cascade circuit relationship. The output of buffer amplifier 70 is transmitted to operational amplifier 74 through a piar of field effect transistors 80 and 81. Amplifier 74 is chosen from well known conventional operational amplifiers, the function of this particular amplifier being to perform a differentiation of a signal input to circuit 42. The output 82 of the operational amplifier is directly proportional to vertical velocity of the vehicle and is fed to a suitable indicator as discussed above.

In addition to a transformer conventionally referred to as a differential transformer, other motion sensitive devices may also be used. Among such other devices contemplated are wholly electronic modulators as well as transformers having windings which can be variably spaced relative to its magnetic core.

What is claimed is:

1. In a combination altitude and vertical velocity indicator for a vehicle, a deformable, airtight capsule sensitive to changes in atmospheric pressure and including at least one moveable member which moves in proportion to changes in pressure, an electronic oscillator for generating an electrical signal, a motion responsive transformer having a primary winding connected to the output of said oscillator, a secondary winding, and moveable means associated with the magnetic circuit connecting the primary and secondary windings for changing said circuit and thereby modulating the output from said secondary winding, means directly securing the moveable means of said transformer to the moveable member of said capsule so that each increment of motion of said member is transferred to said moveable means without modification, one of said capsule and said transformer being so constructed and arranged that the electrical signal coupled to said secondary winding varies linearly as a function of altitude change of said indicator, demodulator means electrically connected to said secondary winding of said transformer for emitting electrical signals in response to deformation of the capsule such that each signal of a certain magnitude is associated with a certain altitude, means for visually indicating the altitude of the vehicle in response to signals received from the demodulator means, electronic circuit means including a computing amplifier for receiving signals from the demodulator means and for differentiating the signals into signals indicating the vertical velocity of the vehicle, and means for visually indicating the vertical velocity of the vehicle in response to signals received from the means for transforming the signals.

References Cited

UNITED STATES PATENTS

| | | | |
|---|---|---|---|
| 2,404,746 | 7/1946 | Rylsky et al. | 73—387 XR |
| 2,946,012 | 7/1960 | Patchell | 328—144 |
| 2,931,221 | 4/1960 | Rusk | 73—179 |
| 3,064,478 | 11/1962 | Schafer | 73—386 XR |
| 3,068,699 | 12/1962 | Fischer | 73—386 |
| 3,161,059 | 12/1964 | Burggren | 73—386 XR |
| 3,232,530 | 2/1966 | Ricke et al. | 73—182 XR |
| 3,312,110 | 4/1967 | Armstrong | 73—182 XR |
| 3,321,968 | 5/1967 | Joline | 73—179 |
| 3,358,505 | 12/1967 | Andresen | 73—179 |

DONALD O. WOODIEL, Primary Examiner

U.S. Cl. X.R.

73—386